United States Patent [19]
Nettleton

[11] 4,413,971
[45] Nov. 8, 1983

[54] RUBBER RECOVERY APPARATUS
[75] Inventor: James S. Nettleton, Sarnia, Canada
[73] Assignee: Polysar Limited, Sarnia, Canada
[21] Appl. No.: 377,265
[22] Filed: May 11, 1982
[30] Foreign Application Priority Data
Jun. 22, 1981 [CA] Canada .................................... 380339
[51] Int. Cl.³ .............................................. A01J 21/02
[52] U.S. Cl. .................... 425/311; 264/142; 425/317
[58] Field of Search ...................... 264/11, 12, 13, 14, 264/142, 8; 209/144, 148, 159, 211; 425/144, 289, 310, 311, 306, 317

[56] References Cited
U.S. PATENT DOCUMENTS

| 3,034,647 | 5/1962 | Giesse | 209/144 |
| 3,323,222 | 6/1967 | Skidmore | 264/142 |
| 3,415,917 | 12/1968 | Watanabe | 264/142 |
| 3,874,835 | 4/1975 | Rossiter | 425/306 |
| 3,973,890 | 8/1976 | Porter | 425/311 |

FOREIGN PATENT DOCUMENTS
2044639A 10/1980 United Kingdom .

Primary Examiner—Jay H. Woo
Attorney, Agent, or Firm—Stevens, Davis, Miller & Mosher

[57] ABSTRACT

Apparatus is provided for the recovery of dry polymer in porous crumb form in which pellets of polymer containing volatile material from a cutter located at the output end of an extrusion device are conveyed by a first gas stream from the cutter through a first pipe means to a cyclone separator. A second pipe means is supplied with and conveys a second gas stream to the cyclone separator, both the first and second pipe means terminating at and forming an entry to the cyclone separator in which the pellets are cooled and separated from the gas streams and volatile material. The pellets are then removed from the cyclone separator and conveyed to weighing and packaging means.

8 Claims, 6 Drawing Figures

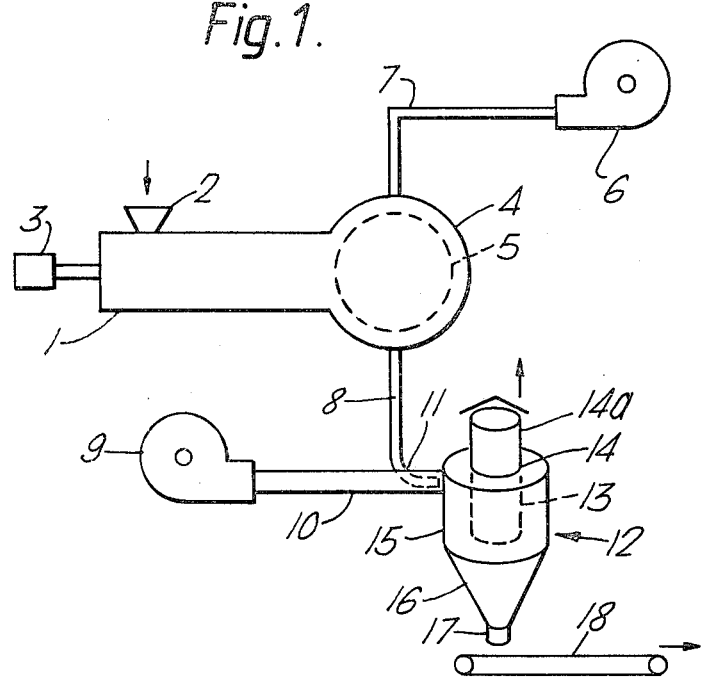
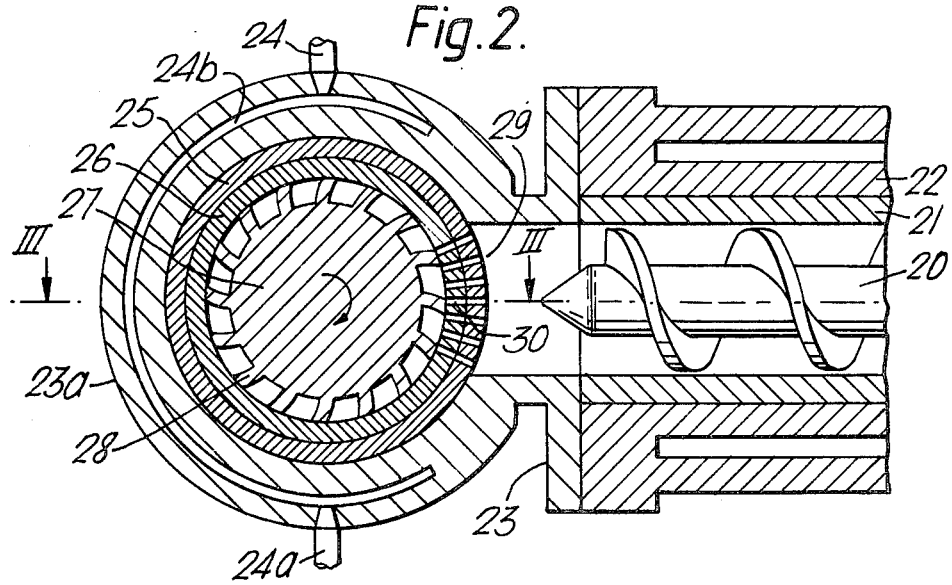
Fig.1.
Fig.2.

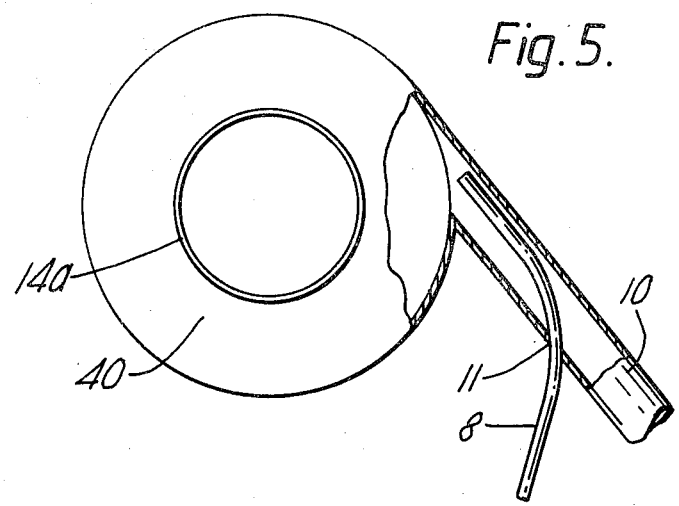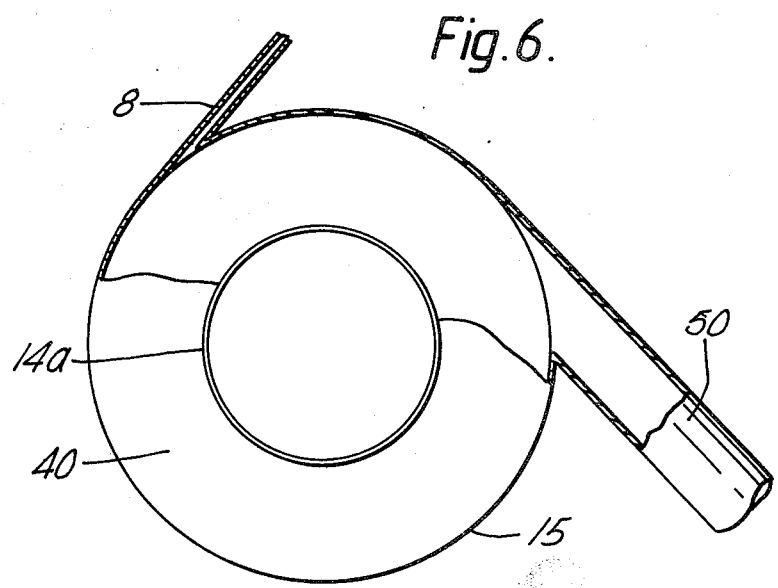

RUBBER RECOVERY APPARATUS

BACKGROUND OF THE INVENTION

This invention is directed to apparatus for the recovery of dry polymer in porous crumb form utilizing a face-cutting apparatus for making pellets from which the porous crumb is derived.

PRIOR ART

Face-cutting apparatus is described in U.S. Pat. Nos. 3,874,835 and 3,973,890. In such apparatus, an extruder supplies heat-softened polymeric material to a die plate means which is cylindrically shaped and is provided with a plurality of radially extending extrusion orifices through which the heat-softened polymeric material is extruded due to the pressure generated by the rotating feed-screws of the extruder. A cutter having a plurality of blades, each of which is equipped with a cutting edge associated with the downstream face of the die plate means, is rotated to shear into pellet form the heat-softened polymeric material extruded through the orifices. The die plate means comprises a pair of nested die plates mounted for selective positioning relative one to the other, each die plate being provided with extrusion orifices whereby upon rotation of one die plate relative to the other the extrusion orifices may be aligned or misaligned relative to one another. The cutter is of a cylindrical form and the blades project radially from the cylindrical body and extend longitudinally therealong. Adjacent pairs of blades on the cutter and the intervening portion of the body of the cutter establish continuous longitudinally extending channels which serve to collect the pellets as they are formed. Rotation of the cutter causes the blades to appear to advance in one axial direction when the blades are helically arranged on the body of the cutter. Supply of a stream of pellet treating fluid to the chamber enclosing the cutter allows said fluid to sweep each pellet from the cutting edge of the blade as the pellet is severed and the pellets to be collected at the downstream end of the cutter.

When the polymeric material to be fed to the prior art apparatus contained from about 6 to about 15 weight percent of volatile material, said volatile material especially being water, the apparatus provided a limited means of removing some proportion of said volatile material as well as providing the polymeric material in pellet form. However, the prior art apparatus does not provide sufficient means of removing said volatile material to produce an acceptable product and of adequately cooling the polymeric material.

BRIEF SUMMARY OF THE INVENTION

The present invention provides, in combination, an improved apparatus for the recovery of dry polymer in porous crumb form wherein pellets of polymer containing volatile material from a cutter located at the output end of an extrusion device are conveyed by a first gas stream from said cutter through a first pipe means to a cyclone separator. A second pipe means is supplied with and conveys a second gas stream to the cyclone separator, both said first and said second pipe means terminating at and forming an entry to the cyclone separator wherein the pellets are cooled and separated from the gas streams and volatile material. The pellets are then removed from the cyclone separator and conveyed to weighing and packaging means.

In accordance with the invention, there is provided an improved apparatus for the recovery of dry polymer in porous crumb form which comprises in combination:
 (a) an extrusion device which terminates in a die means, said die means comprising a pair of generally cylindrical concentric plates each having a plurality of spaced apart extrusion orifices through which polymer is extruded, the downstream-most plate being rotatably mounted with respect to the upstream-most plate, said upstream-most plate presenting a concave surface in the downstream direction, said downstream-most plate being coaxial with and in mating nesting engagement with a generally concave surface of said upstream-most plate,
 (b) cutter means having a generally cylindrical body mounted for rotation about its longitudinal axis and being co-axial with and closely spaced from and within said pair of concentric plates, said cutter means being equipped with a plurality of spaced apart blades which project radially from and extend in a helical manner longitudinally along said body, said blades having at their free ends a cutting edge which is closely spaced adjacent to the downstream side of said downstream-most plate,
 (c) first gas compressing means capable of supplying compressed gas at a pressure of from about 7 to about 15 psig and at a linear velocity of from about 75 to about 150 feet per second to said concentric plates to cause gas to flow over said plates and longitudinally over said cutter means in a downstream direction whereby pellets of polymer formed therein are flushed in a downstream direction,
 (d) first pipe means for transferring said pellets of polymer is said compressed gas away from said cutter means,
 (e) second gas compressing means capable of supplying compressed gas at a pressure of from about 0.07 to about 0.35 psig and at a linear velocity of from about 100 to about 150 feet per second,
 (f) second pipe means having a cross-sectional area of from about 4 to about 8 times the cross-sectional area of said first pipe means and connected at one end to said second gas compressing means,
 (g) said first pipe means being joined into said second pipe means and terminating within said second pipe means in a downstream direction thereof, both said first and said second pipe means terminating at a point closely adjacent to and downstream of the junction thereof and forming the entry to a cyclone separator, said entry being tangential to the circumference of the upper portion of the cylindrical section of said cyclone separator,
 (h) said cyclone separator comprising an upper cylindrical section and attached thereto a lower inverted truncated conical section, said upper cylindrical section having on its topmost closed end a re-entrant exit port for gas and said lower inverted truncated conical section having at its lowest end a lower exit port for porous polymer crumb, and
 (i) conveying means for conveying said porous polymer crumb from said lower exit port of said cyclone separator, optionally to further vapor removal/cooling means, to weighing and packaging means.

In accordance with the invention, there is further provided an improved apparatus for the recovery of dry polymer in porous crumb form which comprises in combination:

(a) an extrusion device which terminates in a die means, said die means comprising a pair of generally cylindrical concentric plates each having a plurality of spaced apart extrusion orifices through which polymer is extruded, the downstream-most plate being rotatably mounted with respect to the upstream-most plate, said upstream-most plate presenting a concave surface in the downstream direction, said downstream-most plate being co-axial with and in mating nesting engagement with a generally concave surface of said upstream-most plate, (b) cutter means having a generally cylindrical body mounted for rotation about its longitudinal axis and being co-axial with and closely spaced from and within said pair of concentric plates, said cutter means being equipped with a plurality of spaced apart blades which project radially from and extend in a helical manner longitudinally along said body, said blades having at their free ends a cutting edge which is closely spaced adjacent to the downstream side of said downstream-most plate, (c) first gas compressing means capable of supplying compressed gas at a pressure of from about 7 to about 15 psig and at a linear velocity of from about 75 to about 150 feet per second to said concentric plates to cause gas to flow over said plates and longitudinally over said cutter means in a downstream direction whereby pellets of polymer formed therein are flushed in a downstream direction, (d) first pipe means for transferring said pellets of polymer in said compressed gas away from said cutter means, (e) second gas compressing means capable of supplying compressed gas at a pressure of from about 0.07 to about 0.35 psig and at a linear velocity of from about 100 to about 150 feet per second, (f) second pipe means having a cross-sectional area of from about 4 to about 8 times the cross-sectional area of said first pipe means and connected at one end to said second gas compressing means, (g) both said first and said second pipe means terminating at and forming separate entries to a cyclone separator, said entries both being tangential to the circumference of the upper portion of the cylindrical section of said cyclone separator, said entries being similarly directed to cause the materials exiting from both said first and said second pipe means to flow in the same direction within said cyclone separator, said entries both being at essentially the same elevation of said cyclone separator, (h) said cyclone separator comprising an upper cylindrical section and attached thereto a lower inverted truncated conical section, said upper cylindrical section having on its topmost closed end a re-entrant exit port for gas and said lower inverted truncated conical section having at its lowest end a lower exit port for porous polymer crumb, and, (i) conveying means for conveying said porous polymer crumb from said lower exit port of said cyclone separator, optionally to further vapor removal/cooling means, to weighing and packaging means.

The apparatus of the present invention has been outlined hereinabove and the following detailed description will provide a better understanding of the combination. Those skilled in the art will readily appreciate that the disclosure herein given may be utilized for designing other structures of equivalent characteristics which will, in their operation, provide dry porous crumb. The most significant result of using the apparatus as herein described is that porous crumb having a residual volatile content of less than about 1.5 weight percent, preferably less than about 0.5 weight percent, and most preferably less than about 0.3 weight percent is readily obtained at a low enough temperature that packaging problems due to hot polymer are largely eliminated.

BRIEF DESCRIPTION OF THE DRAWINGS

FIG. 1 is a schematic layout of an apparatus according to one embodiment of the invention.

FIG. 2 is a sectional view of a cutter means.

FIG. 5 is a top view of the cyclone separator shown in FIG. 4.

FIG. 6 is a top view of a further embodiment of a cyclone separator.

DETAILED DESCRIPTION

Figure 3:
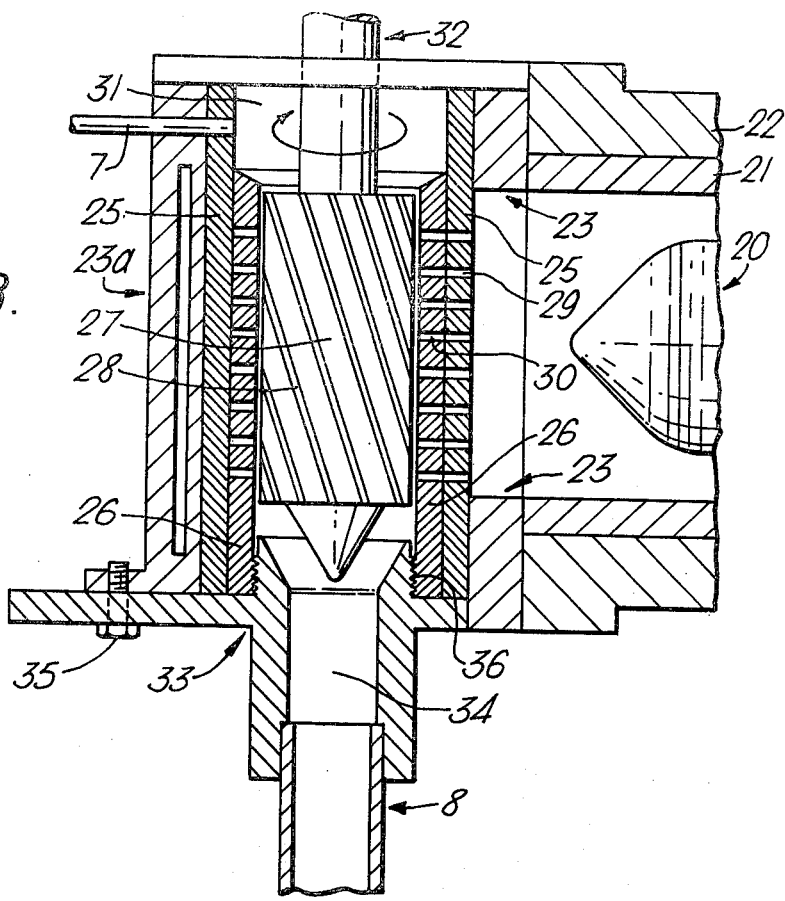
FIG. 3 is a section of the cutter means taken along line III—III of FIG. 2.

Referring to FIG. 1, an extruder 1 is supplied with polymer fed through hopper 2, the rotatable screw of the extruder being driven by drive means 3. The extruder terminates at cutter means 4 which contains cutter 5. Gas compressor 6 provides a stream of compressed gas at a pressure of from about 7 to about 15 psig to pipe 7 wherein the velocity of the compressed gas is from about 75 to about 150 feet per second, pipe 7 supplying the gas to the cutter means as will be described in more detail hereinafter. Pellets of polymer are transported away from the cutter means by the compressed gas in pipe 8. Gas compressor 9 provides a stream of compressed gas at a pressure of from about 0.07 to about 0.35 psig to pipe 10 wherein the velocity of the compressed gas is from about 100 to about 150 feet per second, the pipe 10 having a cross-sectional area of from about 4 to about 8 times the cross-sectional area of pipe 8. In this embodiment of the present invention, pipe 8 is joined into pipe 10 at junction 11 such that pipe 8 terminates within pipe 10 in a downstream direction whereby the pellets of polymer at the terminus of pipe 8 are carried by the compressed gas of pipe 10. Pipes 8 and 10 terminate at a point closely adjacent to and downstream of junction 11 and form the entry to cyclone separator 12, the entry being tangential to the circumference of the upper portion of the cylindrical section 15 of the cyclone separator as will be described in more detail hereinafter. The upper cylindrical section 15 of the cyclone separator has on its topmost closed end a re-entrant exit port 14 having attached thereto an upper vent stack 14a whereby gases leave the separator and a lower re-entrant stack 13 which enters into the interior of the upper cylindrical section of the separator generally such that the length of stack 13 is about 50 to about 80 percent of the length of the cylindrical section of the cyclone separator. The lower inverted truncated conical section 16 of the separator is directly attached to the upper cylindrical section and terminates at its lower end in a lower exit port 17 for the porous polymer crumb which is supplied to conveyor 18 for conveying optionally to further vapor removal/cooling means and then to weighing and packaging means (not shown).

Referring now to FIG. 2, there is shown an end of extruder barrel 21, surrounded by extruder cooling or heating barrel 22, and having rotatably mounted therein extruder screw 20. Mounted at the end of the extruder barrel is cutter means housing 23, 23a. The cutter means housing may be equipped with channels 24b for circulation of heating or cooling medium by entry ports 24 and 24a. Located within the cutter means housing is a pair of generally cylindrical plates 25 and 26. Cylindrical plate 25, being the upstream-most plate is fixedly mounted within the cutter means housing and has a plurality of spaced apart extrusion orifices 29 located at the outlet of the extruder. The downstream-most cylindrical plate 26 is rotatably mounted with respect to the upstream-most plate 25 and is co-axial with and in mating nesting engagement with a generally concave surface of plate 25. Plate 26 has a plurality of spaced apart extrusion orifices 30. Cutter means 27 has a generally cylindrical body and is mounted for rotation about its longitudinal axis and is co-axial with and closely spaced from and within the pair of cylindrical plates 25 and 26. The cutter means is equipped with a plurality of spaced apart blades 28 which project radially from the body of the cutter means. The blades have at their free end a cutting edge which is closely spaced adjacent to the downstream side of cylindrical plate 26.

FIG. 3, which is a section taken along the line III—III of FIG. 2, shows another view of the cutter means, with like numerals identifying like items. Extruder screw 20 is rotatably mounted in extruder barrel 21 which is surrounded by extruder cooling or heating barrel 22. Cutter means housing 23, 23a contains the fixed cylindrical plate 25, which contains extrusion orifices 29. Within plate 25 is cylindrical plate 26 which is mounted rotatably with respect to plate 25 by attachment of plate 26 at its lower screw-threaded end 36 to rotation plate 33. Rotation plate 33 may be moved through small angular movements and fastening member 35, which passes through the flange of rotation plate 33 and the flange of cutter means housing 23a, acts to control the location of rotation plate 33 and of the attached cylindrical plate 26. The cutter means 27 is equipped with a plurality of spaced apart blades 28 which project radially from the body of the cutter means and which extend in a helical manner longitudinally along the cutter means. The cutter means is rotated about its longitudinal axis by connection of shaft 32 to a suitable drive means. Immediately above the cutter means is chamber 31 which is supplied with compressed gas from line 7. The gas flows down the cutter means between the blades 28 and cylindrical plate 26 and assists, together with the rotation of the cutter means, in the removal of pellets of polymer formed by the rotating action of the cutter means on the polymer extruded through extrusion apertures 30 and the transportation of the pellets into lower chamber 34. At the lowest end of rotation plate 33 there is attached pipe 8 for conveying the pellets of polymer in the stream of compressed gas away from the cutter means. Due to the fact that the cutter means is closely spaced from the downstream side of cylindrical plate 26, it is necessary that the gas supplied to chamber 31 be at a relatively high pressure in order to be able to pass through to chamber 34 and on into pipe 8. Alignment or mis-alignment of extrusion orifices 29 and 30 is achieved by movement of cylindrical plate 26, by adjustment of rotation plate 33, relative to plate 25, whereby control may be achieved of the rate at which polymer proceeds through the apparatus, the size of the pellets of polymer and the pressure developed by the polymer within the extruder feeding the cutter means.

Figure 4:
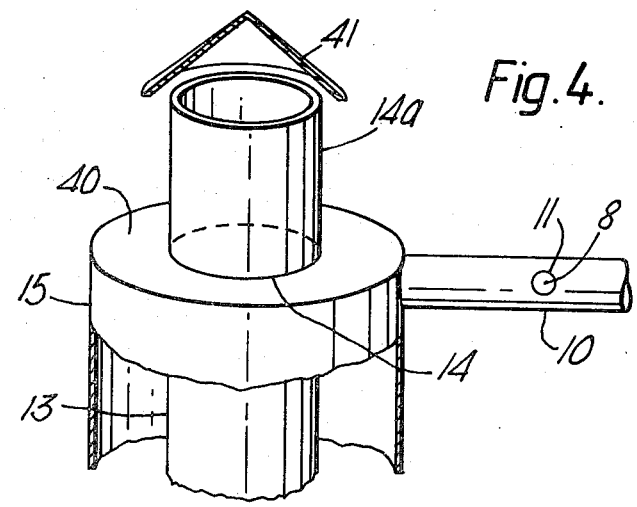
FIG. 4 is a partial sectional view of the embodiment of a cyclone separator shown in FIG. 1.

In FIG. 4, there are shown details, in partial sectional view, of the upper portion of the embodiment of the cyclone separator shown in FIG. 1. The upper cylindrical section 15 of the separator is equipped on its topmost closed end 40 with a re-entrant exit port 14. Attached thereto is an upper vent stack 14a whereby gases leave the separator and a lower re-entrant stack 13 which enters into the interior of the upper cylindrical section. The upper vent stack may be equipped with a cover plate 41. Pipe 10 containing pipe 8 joined thereto at junction 11 supplies compressed gas and pellets of polymer to the separator.

As is shown in FIG. 5, pipe 10 enters the cyclone separator tangential to the circumference of the upper portion of the cylindrical section of the separator. In this embodiment pipe 8 enters pipe 10 at junction 11 and terminates within pipe 10 closely adjacent to and downstream of the junction such that both of pipes 8 and 10 are similarly directed and that the pellets of polymer from pipe 8 are picked up by the flow of compressed gas in pipe 10 and carried into the cyclone separator. Due to the absence of any back pressure generating facilities in the separator, the pressure of the compressed gas in pipe 10 is maintained only at from about 0.07 to about 0.35 psig. The compressed gas in pipe 10 flows at a linear velocity of from about 100 to about 150 feet per second. Because the cross-sectional area of pipe 10 is from about 4 to about 8 times the cross-sectional area of pipe 8, the volume flow rate of gas in pipe 10 is significantly higher than the volume flow rate of gas in pipe 8. Thus, with regard to the compression and supply of gas, there is a significantly lower consumption of energy by providing in pipe 8 only enough compressed gas to transport the pellets of polymer from the cutter means to the cyclone separator and by providing in pipe 10 a higher volume of gas, at very low pressure, to cause the separation and cooling in the cyclone separator and the removal of the associated volatile materials, producing porous crumb at the lower exit of the cyclone separator. The gases from the cyclone separator generally leave by the upper vent stack 14a and carry with them most of the residual volatile materials separated from the pellets of polymer. The pellets of polymer leave the cyclone separator, as porous crumb, through the lower exit port 17 as shown in FIG. 1 in a relatively cool condition (generally about 25° to 40° C. cooler than without the cyclone separator as described herein) and are supplied to conveyor 18. The porous crumb may be supplied by conveyor 18 to further vapor removal/cooling means as desired (not shown), such as by passing ambient temperature air therethrough or over, and then to suitable weighing and packaging means. Suitable vapor removal/cooling means may include providing a section of a conveying means with a supply of gas heated to about 100° to about 125° C. to flow thereover followed by a section of a conveying means with a supply of gas at ambient temperature to flow thereover or may include a section of a conveying means with a supply of gas at ambient temperature to flow thereover.

FIG. 6 shows a further embodiment of a cyclone separator according to the present invention. This embodiment differs from that described hereinabove in connection with FIGS. 1, 4 and 5 in that pipe 8 which supplies the pellets of polymer to the cyclone separator has an entry which is separate from that of pipe 50 which supplies the compressed gas at a pressure of from about 0.07 to about 0.35 psig. The entries of both pipe 8 and pipe 50 are tangential to the circumference of the upper portion of the cylindrical section 15 of the cyclone separator, are similarly directed to cause both of the pellets of the polymer exiting from pipe 8 and the compressed gas exiting from pipe 50 to flow in the same direction within the cyclone separator, and are at essentially the same elevation on the cyclone separator thereby ensuring rapid mixing of the pellets of polymer and the compressed gas. The gas and most of the residual volatile materials leave by the upper vent stack 14a and the pellets of polymer leave the cyclone separator 15 as porous crumb through the lower exit port and are supplied to conveyor 18, as in FIG. 1.

Use of the apparatus of the present invention in the drying of water wet butyl rubber and halogenated butyl rubbers (butyl rubber being a polymer of isobutylene and isoprene) has eliminated many of the prior problems due to obtaining hot polymer crumb which can cause sticking together of the polymer crumb and local hot spots within the packaged polymer. The use of the present apparatus is not limited to butyl rubber and halogenated butyl rubbers but may be used for the drying of any of the water wet synthetic rubbery polymers. With the apparatus of the present invention residual volatiles in the polymer are less than about 1.5 weight percent, preferably less than about 0.5 weight percent, and most preferably less than about 0.3 weight percent. The porous crumb produced by the present apparatus has a temperature of from about 90° to about 110° C. as it exits the cyclone separator and may be cooled to a temperature of about 50° to 60° C. by further vapor removal/cooling means prior to weighing and packaging.

What is claimed is:

1. An improved apparatus for the recovery of dry polymer in porous crumb form which comprises in combination:
   (a) an extrusion device which terminates in a die means, said die means comprising a pair of generally cylindrical concentric plates each having a plurality of spaced apart extrusion orifices through which polymer is extruded, the downstream-most plate being rotatably mounted with respect to the upstream-most plate, said upstream-most plate presenting a concave surface in the downstream direction, said downstream-most plate being co-axial with and in mating nesting engagement with a generally concave surface of said upstream-most plate,
   (b) cutter means having a generally cylindrical body mounted for rotation about its longitudinal axis and being co-axial with and closely spaced from and within said pair of concentric plates, said cutter means being equipped with a plurality of spaced apart blades which project radially from and extend in a helical manner longitudinally along said body, said blades having at their free ends a cutting edge which is closed spaced adjacent to the downstream side of said downstream-most plate,
   (c) first gas compressing means capable of supplying compressed gas at a pressure of from about 7 to about 15 psig and at a linear velocity of from about 75 to about 150 feet per second to said concentric plates to cause gas to flow over said plates and longitudinally over said cutter means in a downstream direction whereby pellets of polymer formed therein are flushed in a downstream direction,
   (d) first pipe means for transferring said pellets of polymer in said compressed gas away from said cutter means,
   (e) second gas compressing means capable of supplying compressed gas at a pressure of from about 0.07 to about 0.35 psig and at a linear velocity of from about 100 to about 150 feet per second,
   (f) second pipe means having a cross-sectional area of from about 4 to about 8 times the cross-sectional area of said first pipe means and connected at one end to said second has compressing means,
   (g) said first pipe means being joined into said second pipe means and terminating within said second pipe means in a downstream direction thereof, both said first and said second pipe means terminating at a point closely adjacent to and downstream of the junction thereof and forming the entry to a cyclone separator, said entry being tangential to the circumference of the upper portion of the cylindrical section of said cyclone separator,
   (h) said cyclone separator comprising an upper cylindrical section and attached thereto a lower inverted truncated conical section, said upper cylindrical section having on its topmost closed end a re-entrant exit port for gas and said lower inverted truncated conical section having at its lowest end a lower exit port for porous polymer crumb, and
   (i) conveying means for conveying said porous polymer crumb from said lower exit port of said cyclone separator, optionally to further vapor removal/cooling means, to weighing and packaging means.

2. The apparatus of claim 1 wherein the re-entrant exit port of said cyclone separator has attached thereto an upper vent stack and a lower re-entrant stack which enters into the interior of the upper cylindrical section of said separator.

3. The apparatus of claim 2 wherein said lower re-entrant stack has a length of about 50 to about 80 percent of the length of the cylindrical section of the cyclone separator.

4. An improved apparatus for the recovery of dry polymer in porous crumb form which comprises in combination:
   (a) an extrusion device which terminates in a die means, said die means comprising a pair of generally cylindrical concentric plates each having a plurality of spaced apart extrusion orifices through which polymer is extruded, the downstream-most plate being rotatably mounted with respect to the upstream-most plate, said upstream-most plate presenting a concave surface in the downstream direction, said downstream-most plate being co-axial with and in mating nesting engagement with a generally concave surface of said upstream-most plate,
   (b) cutter means having a generally cylindrical body mounted for rotation about its longitudinal axis and being co-axial with and closely spaced from and within said pair of concentric plates, said cutter means being equipped with a plurality of spaced apart blades which project radially from and extend in a helical manner longitudinally along said body, said blades having at their free ends a cutting edge which is closed spaced adjacent to the downstream side of said downstream-most plate, (c) first gas compressing means capable of supplying compressed gas at a pressure of from about 7 to about 15 psig and at a linear velocity of from about 75 to about 150 feet per second to said concentric plates to cause gas to flow over said plates and longitudinally over said cutter means in a downstream direction whereby pellets of polymer formed therein are flushed in a downstream direction, (d) first pipe means for transferring said pellets of polymer in said compressed gas away from said cutter means, (e) second gas compressing means capable of supplying compressed gas at a pressure of from about 0.07 to about 0.35 psig and at a linear velocity of from about 100 to about 150 feet per second, (f) second pipe means having a cross-sectional area of from about 4 to about 8 times the cross-sectional area of said first pipe means and connected at one end to said second gas compressing means, (g) both said first and said second pipe means terminating at and forming separate entries to a cyclone separator, said entries both being tangential to the circumference of the upper portion of the cylindrical section of said cyclone separator, said entries being similarly directed to cause the materials exiting from both said first and said second pipe means to flow in the same direction within said cyclone separator, said entries both being at essentially the same elevation on said cyclone separator, (h) said cyclone separator comprising an upper cylindrical section and attached thereto a lower inverted truncated conical section, said upper cylindrical section having on its topmost closed end a re-entrant exit port for gas and said lower inverted truncated conical section having at its lowest end a lower exit port for porous polymer crumb, and (i) conveying means for conveying said porous polymer crumb from said lower exit port of said cyclone separator, optionally to further vapor removal/cooling means, to weighing and packaging means.

5. The apparatus of claim 4 wherein the re-entrant exit port of said cyclone separator has attached thereto an upper vent stack and a lower re-entrant stack which enters into the interior of the upper cylindrical section of said separator.

6. The apparatus of claim 5 wherein said lower re-entrant stack has a length of about 50 to about 80 percent of the length of the cylindrical section of the cyclone separator.

7. The apparatus of claims 1 or 4 wherein the further vapor removal/cooling means comprises a section of a conveying means supplied with a gas heated to about 100° to about 125° C. to flow thereover followed by a section of a conveying means supplied with a gas at ambient temperature to flow thereover.

8. The apparatus of claims 1 or 4 wherein the further vapor removal/cooling means comprises a section of a conveying means supplied with a gas at ambient temperature to flow thereover.

* * * * *